(12) United States Patent
Wang

(10) Patent No.: US 10,850,463 B2
(45) Date of Patent: Dec. 1, 2020

(54) METHOD FOR FABRICATING SPECTACLE FRAME MADE OF CELLULOSE ACETATE SHEET EMBEDDED WITH METAL PIECE

(71) Applicants: Creative International Concept (CIC) Eyewear Manufacturer Ltd., Shenzhen (CN); Daomin Wang, Shenzhen (CN)

(72) Inventor: Daomin Wang, Shenzhen (CN)

(73) Assignee: CREATIVE INTERNATIONAL CONCEPT (CIC) EYEWEAR MANUFACTURER LTD., Shenzhen (CN)

( * ) Notice: Subject to any disclaimer, the term of this patent is extended or adjusted under 35 U.S.C. 154(b) by 293 days.

(21) Appl. No.: 16/100,563

(22) Filed: Aug. 10, 2018

(65) Prior Publication Data

US 2020/0047438 A1 Feb. 13, 2020

(51) Int. Cl.
| | |
|---|---|
| *B29D 12/02* | (2006.01) |
| *G02C 5/00* | (2006.01) |
| *G02C 13/00* | (2006.01) |
| *B29C 35/02* | (2006.01) |

(52) U.S. Cl.
CPC ............. *B29D 12/02* (2013.01); *G02C 5/008* (2013.01); *G02C 13/001* (2013.01); *B29C 35/02* (2013.01)

(58) Field of Classification Search
CPC ...... B29D 12/02; G02C 5/008; G02C 13/001; G02C 1/10; G02C 5/00; G02C 7/02; B29C 35/02; B24B 9/14
USPC ....................................................... 351/178
See application file for complete search history.

(56) References Cited

U.S. PATENT DOCUMENTS

2017/0106610 A1* 4/2017 Manera ................. B29C 70/086

* cited by examiner

*Primary Examiner* — William R Alexander
*Assistant Examiner* — Henry A Duong

(57) ABSTRACT

A method for fabricating a spectacle frame made of a cellulose acetate sheet embedded with the metal piece, where the metal piece is embedded between a main material and auxiliary materials; the metal piece, the main material, and the auxiliary materials are tightly bonded by pressing by a hydraulic press. Since the metal piece is not in contact with a human body, there will be no corrosion problems. The composite plate structure resulting from splicing of the main material and the auxiliary materials have better mechanical performance.

10 Claims, 1 Drawing Sheet

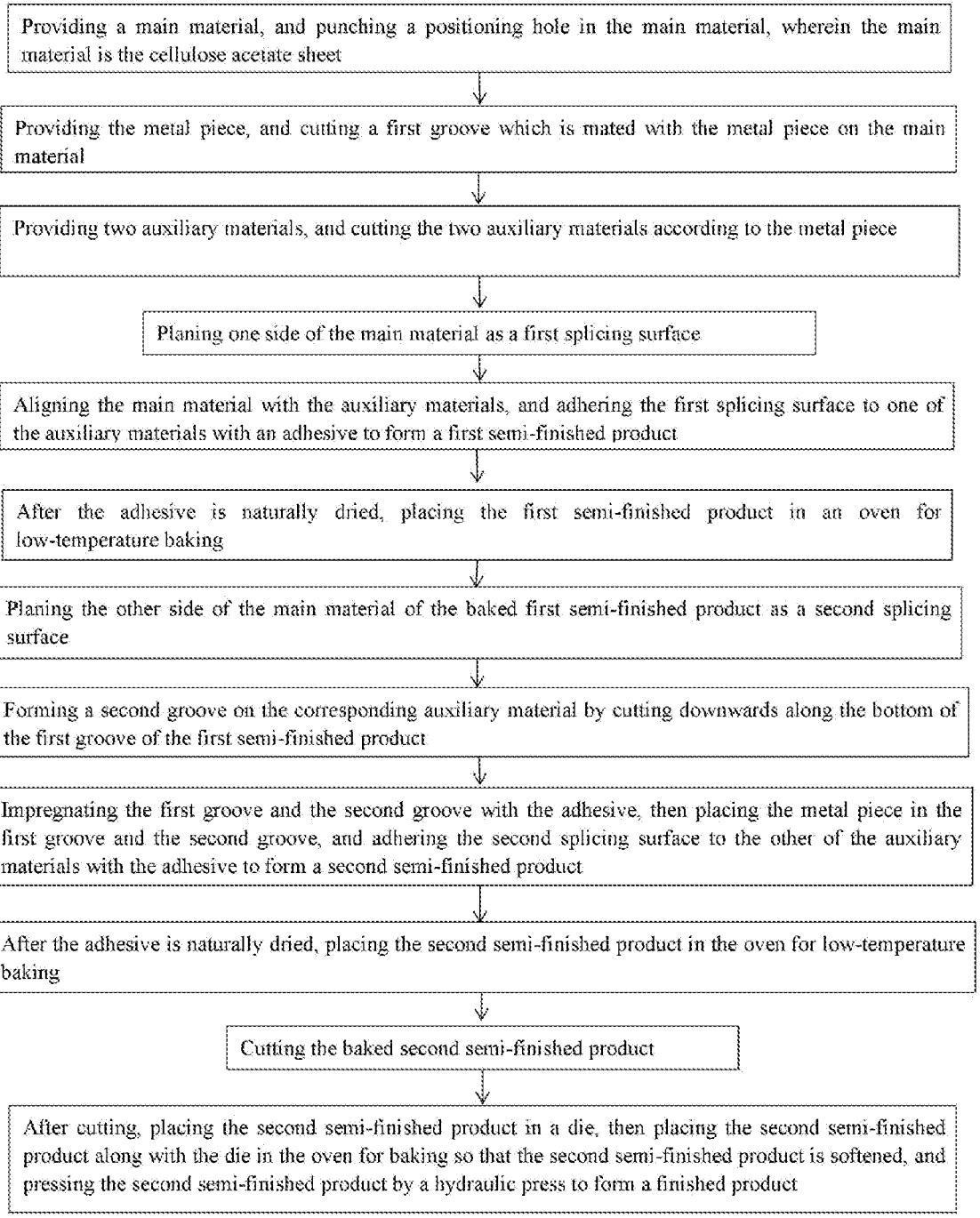

METHOD FOR FABRICATING SPECTACLE FRAME MADE OF CELLULOSE ACETATE SHEET EMBEDDED WITH METAL PIECE

FIELD

The present invention relates to the technical field of spectacle frame fabrication, and more particularly, to a method for fabricating a spectacle frame made of a cellulose acetate sheet embedded with a metal piece.

BACKGROUND

Common spectacle frames comprise metal spectacle frames and plastic spectacle frames. The metal spectacle frame is rigid, which is easy to cause the crack of lenses after impact. Also, the metal spectacle frame has a single color, is heavy-weight, and is poor in the wearer's comfort. The plastic spectacle frame is light-weight, but is limited due to the physical characteristics of the material; the frame is bulky and is easily broken after being subject to a force.

The existing plastic spectacle frame is usually made of a cellulose acetate material. In order to endow a spectacle frame with the advantages of a plastic material and a metal material simultaneously, during a process of fabricating the spectacle frame, a cellulose acetate spectacle frame is fabricated first, and then, a metal piece is embedded on the surface of the cellulose acetate spectacle frame. However, this spectacle frame is still poor in corrosion resistance.

SUMMARY

An object of the present invention is to provide a method for fabricating a spectacle frame made of a cellulose acetate sheet embedded with a metal piece. In the method, the metal piece can be embedded in the cellulose acetate sheet, so that the corrosion resistance of the spectacle frame is improved.

A method for fabricating a spectacle frame made of a cellulose acetate sheet embedded with a metal piece comprises the following steps: providing a main material, and punching a positioning hole in the main material, wherein the main material is the cellulose acetate sheet; providing the metal piece, and cutting a first groove which is mated with the metal piece on the main material, wherein the first groove penetrates through the main material; providing two auxiliary materials, and cutting the two auxiliary materials according to the metal piece; planing one side of the main material as a first splicing surface; aligning the main material with the auxiliary materials, and adhering the first splicing surface to one of the auxiliary materials with an adhesive to form a first semi-finished product; after the adhesive is naturally dried, placing the first semi-finished product in an oven for low-temperature baking; planing the other side of the main material of the baked first semi-finished product as a second splicing surface; forming a second groove on the corresponding auxiliary material by cutting downwards along the bottom of the first groove of the first semi-finished product, wherein the depth of the second groove is lower than the thickness of the corresponding auxiliary material, and the sum of the depth of the first groove and the depth of the second groove is slightly greater than the thickness of the metal piece; impregnating the first groove and the second groove with the adhesive, then placing the metal piece in the first groove and the second groove, and adhering the second splicing surface to the other of the auxiliary materials with the adhesive to form a second semi-finished product; after the adhesive is naturally dried, placing the second semi-finished product in the oven for low-temperature baking; cutting the baked second semi-finished product; after cutting, placing the second semi-finished product in a die, then placing the second semi-finished product along with the die in the oven for baking so that the second semi-finished product is softened, and pressing the second semi-finished product by a hydraulic press to form a finished product; and mounting metal fittings on the finished product.

Preferably, in step S50, transparent gummed paper is used to enclose the positioning hole before the adhering step is performed.

Preferably, in step S50, the first splicing surface of the main material and one of the auxiliary materials are wrapped with gummed paper after being adhered together, and are pressed for 15-20 seconds.

Preferably, in step S60, the gummed paper is removed before the first semi-finished product is placed in the oven for low-temperature baking, six first semi-finished products are gathered into a bundle, and then, are placed in the oven at 50° C. for baking for 3-4 days.

Preferably, in step S60, the natural drying time is 10-14 hours.

Preferably, in step S90, the second splicing surface of the main material and the other of the auxiliary materials are wrapped with gummed paper after being adhered together, and are pressed for 15-20 seconds.

Preferably, in step S100, the gummed paper is removed before the second semi-finished product is placed in the oven for low-temperature baking, six second semi-finished products are gathered into a bundle, and then, are placed in the oven at 50° C. for baking for 3-4 days.

Preferably, the size of the first groove is greater than that of the metal piece by 0.2 mm-0.5 mm.

Preferably, in step S120, the temperature of the oven is higher than the softening points of the main material and the auxiliary materials, and is lower than the melting points of the main material and the auxiliary materials.

Preferably, in step S120, the temperature of the oven is 220-280° C., and the heating time is 0.5-1 minute.

In the method for fabricating the spectacle frame made of the cellulose acetate sheet embedded with the metal piece, provided by the present invention, the metal piece is embedded between the main material and the auxiliary materials; the metal piece, the main material, and the auxiliary materials are tightly bonded by pressing by the hydraulic press. Since the metal piece is not in contact with the human body, there will be no corrosion problems. The composite plate structure resulting from splicing of the main material and the auxiliary materials has better mechanical performance.

BRIEF DESCRIPTION OF THE DRAWINGS

FIG. 1 is a schematic flow chart of a method for fabricating a spectacle frame made of a cellulose acetate sheet embedded with a metal piece according to the present invention.

DETAILED DESCRIPTION

The present invention will be further described in detail below by reference to the specific embodiments in combination with the accompanying drawings.

Referring to FIG. 1, FIG. 1 shows a method for fabricating a spectacle frame made of a cellulose acetate sheet embedded with a metal piece. The method comprises the following steps.

In step S10, a main material is provided, and a positioning hole is punched in the main material, the positioning hole being used for positioning during processing. The main material is the cellulose acetate sheet.

In step S20, the metal piece is provided, and a first groove which is mated with the metal piece is cut in the main material. The size of the first groove is greater than that of the metal piece by 0.2 mm-0.5 mm.

In step S30, two auxiliary materials are provided, and the two auxiliary materials are cut according to the metal piece.

In step S40, one side of the main material is planed as a first splicing surface.

In step S50, the main material is aligned with the auxiliary materials, and the first splicing surface is adhered to one of the auxiliary materials with an adhesive to form a first semi-finished product. Specifically, transparent gummed paper is used to enclose the positioning hole before the adhering step is performed, so as to prevent the adhesive from flowing into the positioning hole. The first splicing surface of the main material and one of the auxiliary materials are wrapped with gummed paper after being adhered together, and are pressed for 15-20 seconds, so that the main material and the auxiliary material are tightly bonded.

In step S60, after the adhesive is naturally dried, the first semi-finished product is placed in an oven for low-temperature baking.

Specifically, the natural drying time is 10-14 hours. The gummed paper is removed before the first semi-finished product is placed in the oven for low-temperature baking, and six first semi-finished products are gathered into a bundle, and then, are placed in the oven at 50° C. for baking for 3-4 days. 50° C. is lower than the softening points of the main material and the auxiliary materials, and thus, the main material and the auxiliary materials will not be deformed during heating.

In step S70, the other side of the main material of the baked first semi-finished product is planed as a second splicing surface.

In step S80, a second groove is formed on the corresponding auxiliary material by cutting downwards along the bottom of the first groove of the first semi-finished product, the depth of the second groove is lower than the thickness of the corresponding auxiliary material, and the sum of the depth of the first groove and the depth of the second groove is slightly greater than the thickness of the metal piece. The size of the second groove is less than that of the first groove by 0.2 mm-0.5 mm.

In step S90, the first groove and the second groove are impregnated with the adhesive, and then, the metal piece is placed in the first groove and the second groove, and the second splicing surface is adhered to the other of the auxiliary materials with the adhesive to form a second semi-finished product. The second splicing surface of the main material and the other of the auxiliary materials are wrapped with gummed paper after being adhered together, and are pressed for 15-20 seconds.

In step S100, after the adhesive is naturally dried, the second semi-finished product is placed in the oven for low-temperature baking.

The gummed paper is removed before the second semi-finished product is placed in the oven for low-temperature baking, six second semi-finished products are gathered into a bundle, and then, are placed in the oven at 50° C. for baking for 3-4 days.

In step S110, the baked second semi-finished product is cut.

In step S120, after being cut, the second semi-finished product is placed in a die, then, the second semi-finished product along with the die are placed in the oven for baking so that the second semi-finished product is softened, and the second semi-finished product is pressed by a hydraulic press to form a finished product. The temperature of the oven is higher than the softening points of the main material and the auxiliary materials, and is lower than the melting points of the main material and the auxiliary materials. Specifically, the temperature of the oven is 220-280° C., and the heating time is 0.5-1 minute.

In step S130, metal fittings are mounted on the finished product, and the resulting product is a spectacle frame.

If the main material is transparent, one of the auxiliary materials may be eliminated. That is, the cellulose acetate sheet is spliced to one auxiliary material.

The metal piece is embedded between the main material and the auxiliary materials; the metal piece, the main material, and the auxiliary materials are tightly bonded by pressing by the hydraulic press. Since the metal piece is not in contact with the human body, there will be no corrosion problems. The composite plate structure resulting from splicing of the main material and the auxiliary materials has better mechanical performance.

Finally, it should be noted that the above-mentioned embodiments are only intended to illustrate the technical solution of the present invention, and are not intended to limit the scope thereof. Although the present invention is described in detail with reference to the preferred embodiments, it should be understood by those skilled in the art that various modifications and equivalents can be made to the technical solution of the present invention without departing from the spirit and scope of the technical solution of the present invention.

What is claimed is:

1. A method for fabricating a spectacle frame made of a cellulose acetate sheet embedded with a metal piece, the method comprising the following steps:

S10: providing a main material, and punching a positioning hole in the main material, wherein the main material is the cellulose acetate sheet;

S20: providing the metal piece, and cutting a first groove which is mated with the metal piece on the main material;

S30: providing two auxiliary materials, and cutting the two auxiliary materials according to the metal piece;

S40: planing one side of the main material as a first splicing surface;

S50: aligning the main material with the auxiliary materials, and adhering the first splicing surface to one of the auxiliary materials with an adhesive to form a first semi-finished product;

S60: after the adhesive is naturally dried, placing the first semi-finished product in an oven for low-temperature baking;

S70: planing the other side of the main material of the baked first semi-finished product as a second splicing surface;

S80: forming a second groove on the corresponding auxiliary material by cutting downwards along the bottom of the first groove of the first semi-finished product;

S90: impregnating the first groove and the second groove with the adhesive, and then placing the metal piece in the first groove and the second groove, and adhering the second splicing surface to the other of the auxiliary materials with the adhesive to form a second semi-finished product;

S100: after the adhesive is naturally dried, placing the second semi-finished product in the oven for low-temperature baking;

S110: cutting the baked second semi-finished product; and

S120: after cutting, placing the second semi-finished product in a die, then placing the second semi-finished product along with the die in the oven for baking so that the second semi-finished product is softened, and pressing the second semi-finished product by a hydraulic press to form a finished product.

2. The method for fabricating the spectacle frame made of the cellulose acetate sheet embedded with the metal piece according to claim 1, wherein in step S50, transparent gummed paper is used to enclose the positioning hole before the adhering step is performed.

3. The method for fabricating the spectacle frame made of the cellulose acetate sheet embedded with the metal piece according to claim 1, wherein in step S50, the first splicing surface of the main material and one of the auxiliary materials are wrapped with gummed paper after being adhered together, and are pressed for 15-20 seconds.

4. The method for fabricating the spectacle frame made of the cellulose acetate sheet embedded with the metal piece according to claim 3, wherein in step S60, the gummed paper is removed before the first semi-finished product is placed in the oven for low-temperature baking, six first semi-finished products are gathered into a bundle, and then, are placed in the oven at 50° C. for baking for 3-4 days.

5. The method for fabricating the spectacle frame made of the cellulose acetate sheet embedded with the metal piece according to claim 4, wherein in step S60, the natural drying time is 10-14 hours.

6. The method for fabricating the spectacle frame made of the cellulose acetate sheet embedded with the metal piece according to claim 5, wherein in step S90, the second splicing surface of the main material and the other of the auxiliary materials are wrapped with gummed paper after being adhered together, and are pressed for 15-20 seconds.

7. The method for fabricating the spectacle frame made of the cellulose acetate sheet embedded with the metal piece according to claim 5, wherein in step S100, the gummed paper is removed before the second semi-finished product is placed in the oven for low-temperature baking, six second semi-finished products are gathered into a bundle, and then, are placed in the oven at 50° C. for baking for 3-4 days.

8. The method for fabricating the spectacle frame made of the cellulose acetate sheet embedded with the metal piece according to claim 4, wherein the size of the first groove is greater than that of the metal piece by 0.2 mm-0.5 mm.

9. The method for fabricating the spectacle frame made of the cellulose acetate sheet embedded with the metal piece according to claim 4, wherein in step S120, the temperature of the oven is higher than the softening points of the main material and the auxiliary materials, and is lower than the melting points of the main material and the auxiliary materials.

10. The method for fabricating the spectacle frame made of the cellulose acetate sheet embedded with the metal piece according to claim 9, wherein in step S120, the temperature of the oven is 220-280° C., and the heating time is 0.5-1 minute.

* * * * *